Patented Apr. 1, 1947

2,418,135

UNITED STATES PATENT OFFICE 2,418,135

BITUMINOUS ADHESIVE

Samuel A. Moore, Mariemont, and Theodore Greenfield, Cincinnati, Ohio, assignors to Interchemical Corporation, New York, N. Y., a corporation of Ohio No Drawing. Application June 9, 1943, Serial No. 490,228

4 Claims. (Cl. 260—28)

This invention relates to adhesive cements useful in the installation of wall-board, and in general wherever a bituminous cement is desirable for fibrous products. The invention aims to provide an easily spreadable adhesive characterized by its lack of flow after application to a wall and by its excellent adhesive properties.

Bituminous adhesives have been used for a long period of time for the purpose of laminating paper sheets into boards, acting as cements for the laying of wall-board and the like. Adhesiveness and workability are both essential, and an optimum combination of the two properties is particularly difficult to obtain where the adhesive is to be applied by hand tools, such as a trowel. Where the adhesive is to be applied to a wall, there is an additional property necessary—that of lack of flow which further complicates the production of a product with optimum properties.

We have invented a bituminous adhesive which has extremely good adhesion, combined with easy spreadability and lack of flow after application. This adhesive consists essentially of from 10 to 35% of a light petroleum fraction in the light petroleum naphtha (hexane) range, boiling between the limits of about 90° F. to 200° F., and from 65% to 90% of permanent adhesive. The permanent adhesive consists of from 40% to 60% of blown asphalt having a ball and ring softening point between 180° F. and 240° F., and from 60% to 40% of a material of the group consisting of hard stearine pitch (melting point 160-230° F.), and mixtures of a major portion of such a pitch with a minor portion of a hydrocarbon polymer resin which is soluble in petroleum hydrocarbons, and has a melting point of from 200-300° F., in amounts up to about 45% of the pitch resin mixture. The asphalt, pitch and resin are melted together at a temperature ranging from 200° F. to 450° F., for a period of time sufficient to obtain complete admixture of the ingredients while retaining the property of producing a thixotropic body on cooling and mixing with petroleum naphtha, which permits thinning out on mechanical agitation, and bodying up again on standing. Thus, if the temperature is raised substantially above 450° F. (say to 500° F.) the thixotropic characteristics are lost in a matter of a few minutes, apparently due to complete mutual solution of the ingredients. At 450° F., the body is not lost in up to about one hour; however, complete mixture is obtained long before this point is reached. We get our most desirable results by mixing the ingredients at a relatively low temperature (say 220° F.) in a heavy duty mixer such as a Mogul mixer. After the melt is cooled, the petroleum naphtha is added.

Inert fillers may be added if desired, up to a maximum of about 15% of the adhesive; above this point, the inert reduces the adhesiveness. Some inert helps the application properties of the adhesive. Practically any filler may be used—whiting, barytes, various clays, silica, diatomaceous earths, magnesium or aluminum silicates, and various colored pigments may all be used. Very highly oil-absorbent fillers must be used, of course, in rather smaller proportions.

Typical examples of our invention are the following:

Example 1

| | Per cent |
|---|---|
| Hard stearine pitch (160°–170° F. M. P.) | 22.14 |
| Petroleum resin (240° F. M. P.) (catalytic polymer of high temperature cracked recycle stock) | 16.55 |
| Blown asphalt (206° F. M. P.) | 38.70 |
| Light petroleum solvent (hexane fraction) | 10.71 |
| Finely ground magnesium silicate | 11.90 |

This is a thixotropic adhesive which trowels well.

Example 2

| | |
|---|---|
| Hard stearine pitch (190–210° F. M. P.) | 23.80 |
| Petroleum resin (240° F. M. P.) of Example 1 | 5.70 |
| Blown asphalt (206° F. M. P.) | 30.00 |
| Light petroleum solvent (hexane fraction) | 27.90 |
| Whiting | 12.60 |

As will be observed from the examples, the amount of resin used varies somewhat depending on the melting point of the pitch employed. At the low melting point, a maximum of resin is used—as the melting point of the pitch increases, the amount of resin used may be decreased, so that with the highest melting pitches in the indicated range, the resin may be eliminated.

The resin used may be any hydrocarbon polymer soluble in petroleum hydrocarbons. Cumarone indene resins, and various petroleum resins derived from unsaturated petroleum hydrocarbons, may all be used.

Obviously, the examples can be multiplied indefinitely without departing from the scope of our invention which is defined in the claims.

We claim:

1. A thixotropic adhesive composition comprising 10 to 35% of a petroleum naphtha boiling between about 90 and about 200° F. and from 65 to 90% of permanent adhesive consisting of from 40 to 60% of blown asphalt with a ball-and-ring softening point between 180 and 240° F. and from 60 to 40% of a material selected from the group consisting of hard stearine pitch having a melting point between 160 and 230° F. and mixtures thereof with minor proportions of a resin selected from the group consisting of cumarone-indene resins and hydrocarbon resins comprising catalytic petroleum hydrocarbon polymers of high-temperature cracked recycle stock, said resin being soluble in petroleum hydrocarbon solvents and having a melting point between 200 and 300° F., the entire composition being characterized by its thixotropic body.

2. The adhesive composition as claimed in claim 1, which includes up to about 15% of an inert filler.

3. An adhesive composition having the approximate composition:

| | Per cent |
|---|---|
| Hard stearine pitch having a melting point between 160 and 170° F. | 22 |
| Catalytic petroleum hydrocarbon polymer of high-temperature cracked recycle stock having a melting point of 240° F. | 16 |
| Blown asphalt having a ball-and-ring softening point of 206° F. | 39 |
| Light petroleum solvent boiling between about 90 and about 200° F. | 11 |
| Finely ground magnesium silicate | 12 | said composition having a thixotropic body.

4. An adhesive composition having the approximate composition:

| | Per cent |
|---|---|
| Hard stearine pitch having a melting point between 190 and 210° F. | 24 |
| Catalytic petroleum hydrocarbon polymer of high-temperature cracked recycle stock having a melting point of 240° F. | 6 |
| Blown asphalt having a ball-and-ring softening point of 206° F. | 30 |
| Light petroleum solvent boiling between about 90 and about 200° F. | 28 |
| Whiting | 12 | said composition having a thixotropic body.

SAMUEL A. MOORE.
THEODORE GREENFIELD.

REFERENCES CITED

The following references are of record in the file of this patent:

UNITED STATES PATENTS

| Number | Name | Date |
|---|---|---|
| 2,239,126 | Swenarton | Apr. 22, 1941 |
| 1,990,474 | Alvarado | Feb. 12, 1935 |

OTHER REFERENCES

"Cumar"; The Barret Co., 1937, page 31. (Copy in Division 50.)

Fulton et al., Ind & Eng. Chem., vol. 32, March 1940, pages 304 to 309. (Copy in Scie. Libr., 260–82.)